Aug. 17, 1954   A. W. PAULSON   2,686,907
ELEVATOR CAR POSITION INDICATOR APPARATUS
Filed Nov. 21, 1950   3 Sheets-Sheet 1

ARTHUR WILLARD PAULSON
INVENTOR

BY   J.L. Sharon ATTORNEY

Aug. 17, 1954  A. W. PAULSON  2,686,907
ELEVATOR CAR POSITION INDICATOR APPARATUS
Filed Nov. 21, 1950  3 Sheets-Sheet 2

ARTHUR WILLARD PAULSON INVENTOR

BY *J. L. Sharon* ATTORNEY

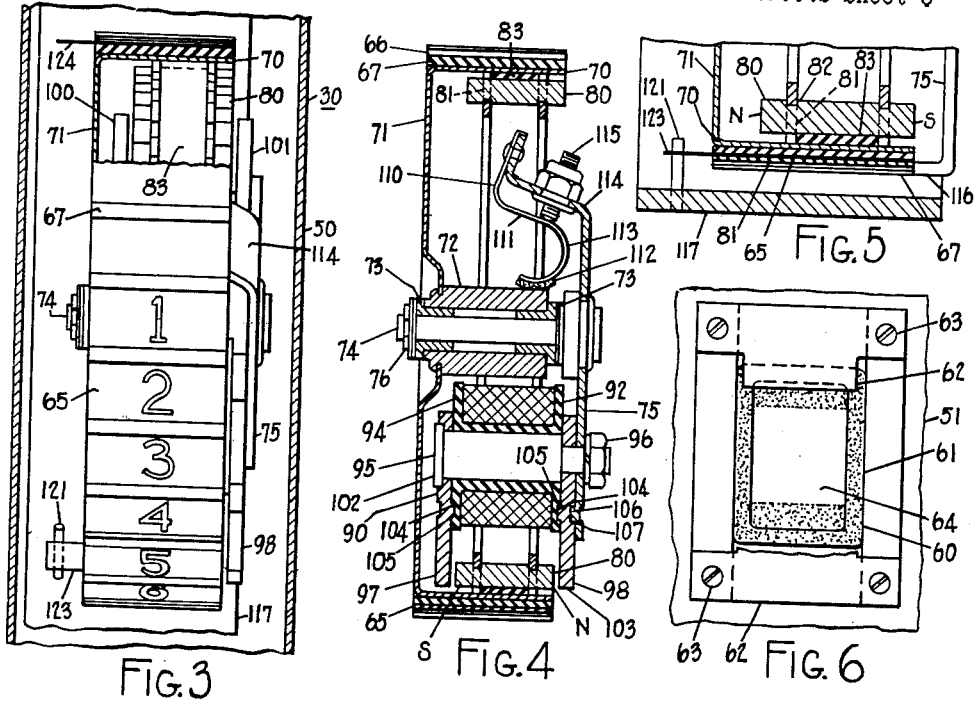
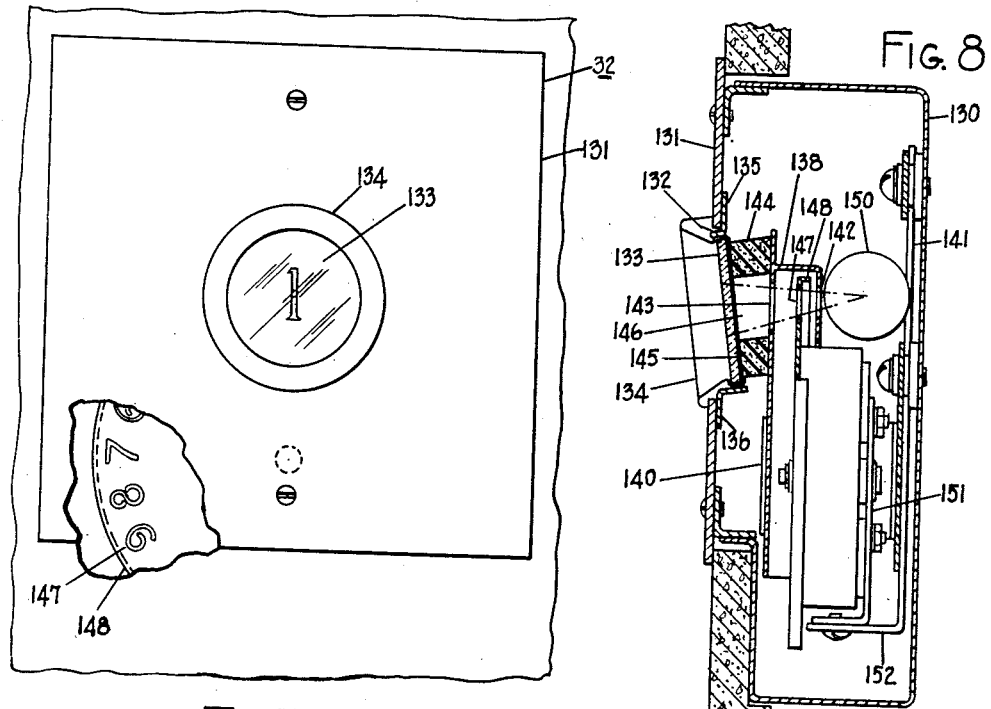

Patented Aug. 17, 1954

2,686,907

UNITED STATES PATENT OFFICE 2,686,907

ELEVATOR CAR POSITION INDICATOR APPARATUS

Arthur Willard Paulson, Summit, N. J., assignor to Otis Elevator Company, New York, N. Y., a corporation of New Jersey Application November 21, 1950, Serial No. 196,802

12 Claims. (Cl. 340—21)

1

The invention relates to elevator car position indicator apparatus.

The provision of car position indicators in elevator systems has been common practice for many years. These indicators are located either at the landings or in the car or both. There are certain advantages in arranging the position indicators as part of the fixtures at the landings which contain circuit controlling devices such as push buttons for actuation by intending passengers. Also there are advantages in having the indicators electromagnetically driven.

One object of the invention is to provide an electromagnetically driven car position indicator which is of simple and compact construction, reliable in operation and which may be economically manufactured and installed.

Another object of the invention is to provide a simple, economical and reliable control system for an electromagnetically driven car position indicator.

One feature of the invention resides in a car position indicator which is readily adaptable to a large number of landings.

Another feature of the invention is a car position indicator suitable for installation at a landing or in the elevator car.

Still another feature of the invention is an elevator car position indicator apparatus in which the number of hoistway wires is minimized.

Other features and advantages of the invention will become apparent from the following description and appended claims.

In carrying out the invention according to the preferred arrangement for installation at a landing, the position indicator is provided as part of a combined push button and position indicator fixture. The characters designating the landings are displayed through an opening in the fixture face plate. These characters are carried by a rotor and are positioned in slots formed in a band on the rim of the rotor. On the inner side of the rim are a given number of permanent magnets equally spaced circumferentially. These magnets are arranged alternately for opposite polarity and are adapted to effect rotative movement of the rim under the influence of two stator field magnets positioned inside the rim and each having a pair of pole pieces for cooperating with the rotor magnets. The pole pieces of one field magnet are displaced one-half of the rotor magnet pitch from those of the other. The coils of the field magnets are energized with unidirectional current derived through

2 rectifiers from a source of alternating current. The supply of current to these coils is commutated in such way that the coils are alternately energized, with each successive energization such that the excited pole pieces are of a polarity to co-act with the proper next adjacent rotor magnet to pull the rotor a distance of one-half pole pitch in the desired direction. With this arrangement and with the corresponding indicator field magnet coils at all landings and in the car connected in parallel, the position indicators may be controlled from the pent house with only three hoistway feed wires.

In the drawings:

Figure 3 is a front view of the indicator dial, taken along the line 3—3 of Figure 2;

Figure 4 is a sectional view of the indicator taken along the line 4—4 of Figure 2;

Figure 5 is a detail in section taken along the line 5—5 of Figure 2;

Figure 6 is a rear view detail of the indicator lens mounted on the fixture face plate;

Figure 7 is a front view of the position indicator illustrated in the elevator car in Figure 1;

Figure 8 is a vertical sectional view of the indicator shown in Figure 7; and

Figures 1, 9:
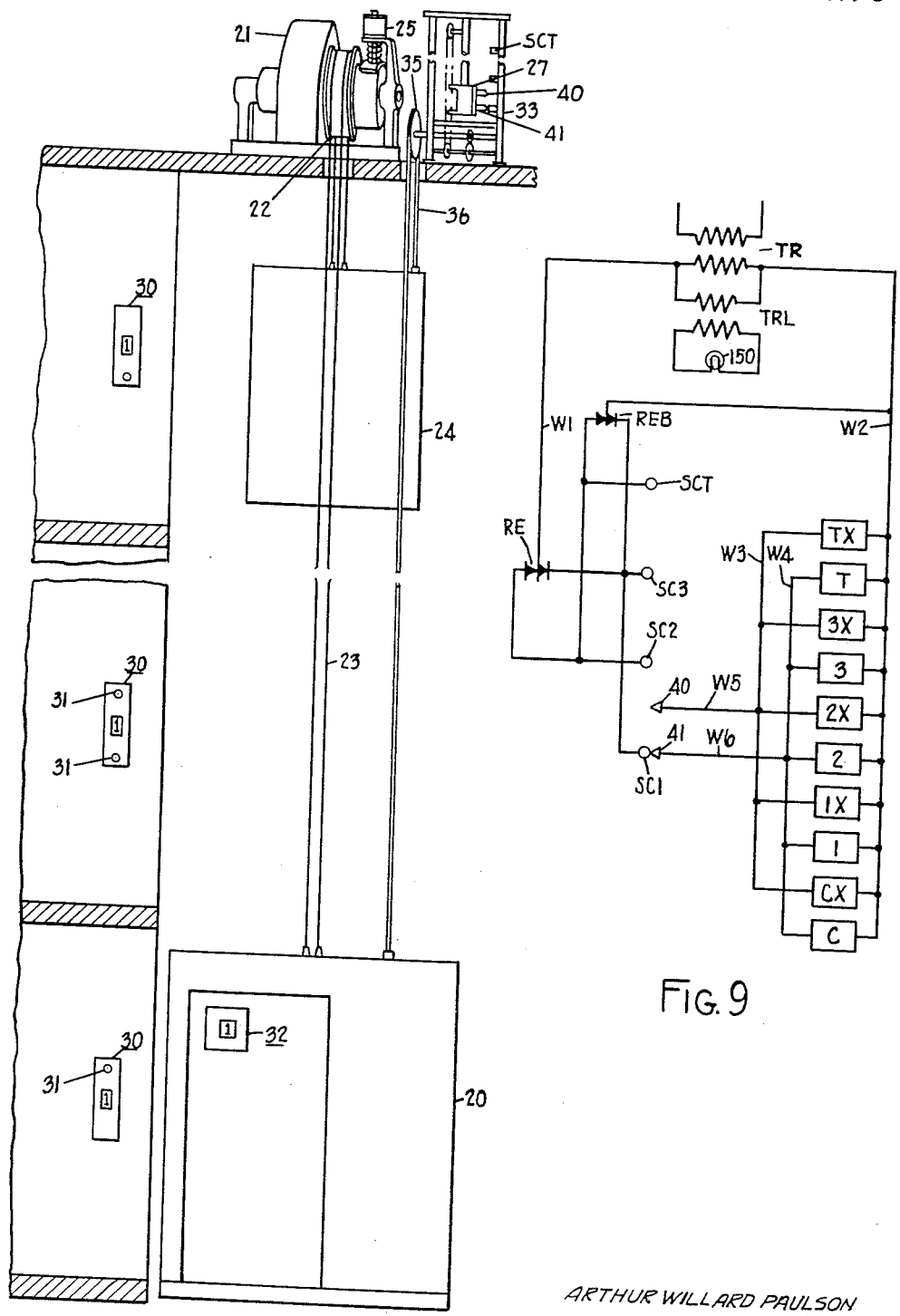
Figure 1 is a schematic representation of an elevator system embodying the invention.
Figure 9 is a schematic wiring diagram of the circuits for position indicators arranged at the landings and in the car, as applied to a four floor installation.

For a general understanding of the invention, reference may be had to Figure 1. The elevator car 20 is raised and lowered by means of a hoisting motor 21. This motor is illustrated as driving a traction sheave 22 over which pass the hoisting ropes 23 for the car and counterweight 24. An electromechanical brake 25 is provided and is applied to effect the final stopping operation and hold the car when at rest.

At each floor is a car position indicator 30, these indicators being arranged in the same fixtures as the push buttons 31. Also, a car position indicator 32 is illustrated in the elevator car. These position indicators are controlled by commutating mechanism which is illustrated as part of a selector 33 arranged in the machine room along with the hoisting motor. The selector drive shaft is provided with a driving wheel 35 which is driven by a tape 36 provided with teeth for meshing with the driving wheel teeth. The tape is attached at one end to the top of the car from which point it extends upwardly to and over the driving wheel and thence downwardly to the counterweight to which the other end of the tape is connected. The drive shaft acts through a gear reduction to drive a chain which in turn drives the crosshead 27. Brushes 40 and 41 are carried by the crosshead for engaging stationary contacts SC to control the operation of the indicators as will be explained later.

Referring now to Figures 2, 3, 4, 5 and 6, the position indicator for installation at the landings will be described. The indicators are combined with the landing push buttons to form combined push button and indicator fixtures. In Figure 1 a fixture has been illustrated which for intermediate landings has both an up push button and a down push button and which for terminal landings has but a single push button. This is typical of certain types of elevator installations. The fixture illustrated in Figures 2, 3, 4, 5, and 6 is for the lower terminal landing. According to the preferred arrangement, the fixture comprises a box 50 which is provided with a face plate 51 secured at the top by a pin 52 fastened to the face plate and extending into a trough 53 formed in a bracket 54. At the bottom the face plate is secured to the box by set screw 55 which engages a bracket 56. The push button 31 extends through the face plate and actuates the contacts 58.

Below the push button, the face plate is provided with an opening 60 for viewing the floor designating characters of the position indicator. This opening is provided with a lens 61 held in place by a pair of clips 62 secured as by screws 63 to the back of the face plate (see Figure 6). The top, bottom and edges of the back of the lens are sand blasted, leaving the clear area 64 for viewing the floor designating characters 65. These characters which are principally in the form of numerals are mounted in slots 66 formed on a retainer band 67 of neoprene. This band has a stretch fit on rim 70 of a drum 71 and is preferably cemented in place. This drum has a hub 72 which is provided with bearings 73. These bearings rotate on a shaft 74 mounted at one end on a fixed base 75. The drum is retained on the shaft by a spring clip 76 provided in a groove in the other end of the shaft.

Around the inside of the rim 70 is a plurality of permanent magnets 80 extending parallel to the shaft 74 and of a given even number equal to the number of floors which the indicator can indicate. These magnets are equally spaced circumferentially and are arranged alternately for opposite polarity as indicated by the letters N and S in Figure 2. They are mounted in slots 81 formed in a pair of spaced non-magnetic rings, slots 82 being formed in the magnets into which the rings fit to maintain the spacing (see Figure 5). The magnets are held in place by a neoprene band 83 stretched around the periphery of the magnets. The ring assembly is held in place in the rim by a forced fit of the band and preferably also by cementing the band to the inside of rim 70. This assembly forms the rotor of the indicator. The band 67 is positioned on the outside of the rim so that the slots 66 line up radially with the permanent magnets.

Rotation of the rotor is effected by field magnets 90 and 91, the coils of which are designated respectively 92 and 93. These magnets are mounted on base 75 of non-magnetic material. Each field magnet coil is wound on a spool 94 of non-magnetic material. A core 95 extends through the spool and is threaded on one end to receive a nut 96 for securing the magnet to the frame. The pole pieces of each magnet are in the form of forked shaped plates mounted one on each side of the spool, those for magnet 90 being designated 97 and 98 and those for magnet 91 being designated 100 and 101. The pole pieces are held in place on one side by a shoulder 102 formed on the core and on the other side by being clamped between the core and the base. The forked portion of each pole piece is formed with three arms 103 which extend over the ends of the rotor magnets and are spaced twice the rotor magnet pitch apart, the arms of the pole pieces of each field magnet being aligned with each other. The field magnet coils and pole pieces are positioned on the base so that when the arms 103 of the pole pieces of one field magnet are opposite rotor magnets, the arms of the pole pieces of the other field magnet are midway between rotor magnets, thus displacing the pole pieces of the two field magnets one-half rotor magnet pole pitch. The pole pieces are held in desired position by projections 104 formed on the pole pieces to extend into indents 105 formed in the magnet spools and similar projections 106 on the base to extend into indents 107 in the pole pieces 98 and 101.

A damping action is exerted on the rotative movement of the rotor by a brake 110. This brake comprises a bent spring 111 having a shoe 112 of friction material such as felt on the curved end 113 of the spring. The shoe engages the hub of the rotor drum. Spring 111 is riveted to a bent arm 114 formed on the base. A screw 115 is provided for adjusting the drag exerted by the brake on the rotor, this screw being mounted in arm 114 to engage the spring 111.

The base is provided with a pair of feet 116 by means of which it is mounted on a chair bracket 117 as by screws. This bracket is secured to brackets 54 and 56, in turn secured to the box. A terminal block 120 for the field coils is mounted on bracket 56. A pin 121 is mounted in the lower arm 122 of bracket 117 toward one side thereof and extends therefrom into position overlapping the rim 70. This pin serves to limit the arc of rotative movement of the rotor and is engaged by stops one of which designated 123 is slid in a slot 66 (and under the numeral 65 if the slot contains a numeral) to engage the pin when the car reaches the first floor and the other of which designated 124 is slid in a slot 66 to engage the pin when the car reaches the top floor, illustrated as the ninth floor, these stops sticking out beyond the rim to engage the pin.

While the position indicator construction as above described may be used in the elevator car under certain conditions, the modified arrangement illustrated in Figures 7 and 8 is preferred because the box is not as deep and the floor numerals are larger. The car position indicator fixture illustrated in Figures 7 and 8 comprises a shallow box 130 provided with a face plate 131. The face plate is provided with an opening 132 for viewing the floor numerals. This opening is provided with a ground glass screen 133 held in a bezel 134, in turn secured to the face plate as by brazing to brackets 135 and 136. A light baffle 138 is positioned behind the window and is supported by a pair of brackets 140 mounted on a pair of plates 141 secured to the back of the box with cushioning grommets. This baffle is provided with a pair of openings 142 and 143 opposite the center of the screen, a piece of sponge rubber 144 being arranged between the baffle and a mark 145 on the back of the screen and being provided with an opening 146. The floor designating numerals 147 are arranged in the annular flange 148 mounted on the position indicator rotor. These numerals are stamped out to permit passage of light therethrough from a lamp 150 of pin point source type mounted in back of the flange on one of the plates 141, thus projecting an enlarged image on the screen. The rotor shaft and field magnets are mounted on the base 151, the base being supported on feet 152 formed on plates 141.

The position indicator circuits for a four floor installation are illustrated in Figure 9 to which reference may now be had. The corresponding field coils 92 and 93 of the various indicators are connected in parallel by hoistway wires W2, W3 and W4. For convenience, these coils are designated as to indicator location by letters and numerals and those of each indicator are distinguished from each other by appending the letter X to one of the coils. Thus, for example, the coils of the indicator mounted in the car are designated C, those of the indicator at the first floor are designated 1 and those of the indicator at the top floor are designated T, those with the appended X being coils 93 and those without appendage being coils 92. Coils C, 1, 2, 3 and T are connected by wire W6 to selector brush 41 while coils CX, 1X, 2X, 3X and TX are connected by wire W5 to selector brush 40. These brushes are adapted to engage selector stationary contacts SC1, SC2, SC3 and SCT for the first, second, third and top floors respectively. When the car is stopped at a floor, brush 41 is in engagement with the stationary contact for that floor with brush 40 a distance corresponding to one-half minimum floor height above. Alternate stationary contacts are connected together to form two groups. The circuits are connected to the secondary of transformer TR to be supplied with direct current derived therefrom through two half-wave rectifiers RE connected to supply current in opposite directions to the two groups of stationary contacts. TRL is a transformer for providing current at the proper voltage for lamp 150 of the position indicator in the car, this transformer being located in the car.

Figure 2:
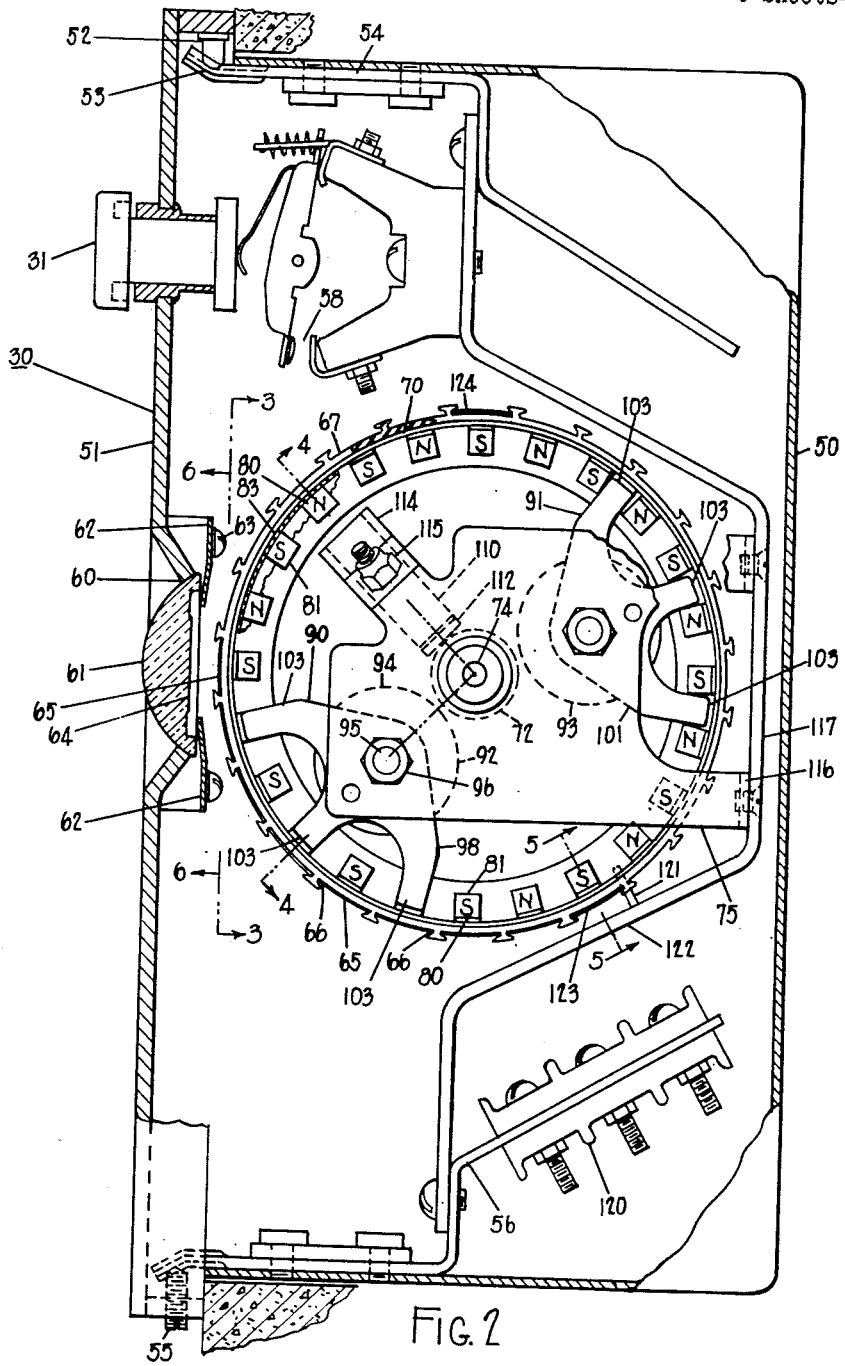
Figure 2 is a view in side elevation, with parts broken away, of the preferred arrangement of the combination push button and position indicator fixture illustrated at the landings in Figure 1.

The circuits are illustrated for the condition with the car at the first floor. All the position indicators will register the numeral "1" under such conditions, this being assured by the stop pins 121. While the position indicator shown in Figure 2 is arranged for more than a four floor installation, it is shown in position indicating the car at the first floor. In this position the forked arms 103 of pole piece 98 are opposite the north poles of rotor magnets so that coil 92, i. e., each of coils C, 1, 2, 3 and T in Figure 9, is energized in a direction to excite pole piece 98 to provide south poles at its arms, and to excite pole piece 97 to provide north pole arms at the south pole ends of these rotor magnets. The circuit, Figure 9, is from the left-hand side of the secondary winding of transformer TR, by way of wire W1 through the right-hand side of rectifier RE, stationary contact SC1, brush 41, wires W6 and W4, coil 1 and wire W2 to the right-hand side of the transformer secondary, coils C, 2, 3 and T being energized in parallel with coil 1 by way of wire W4.

It is to be noted that under this condition, the arms of pole pieces 100 and 101 are in between rotor magnets with those of pole piece 101 one-half rotor pole pitch counter-clockwise of the north poles of rotor magnets. Also coil 93, i. e., coils CX, 1X, 2X, 3X and TX of Figure 9, is de-energized at this time as brush 40 is disengaged from stationary contacts. As the rotor is to be moved clockwise for upward car travel, coil 93 is connected to be energized in a direction to excite pole piece 101 to provide north poles at its arms upon the engagement of brush 40 with contact SC2 as the car travels upwardly from the first floor. Also pole piece 100 provides south poles at its arms. The circuit is from the right-hand side of the transformer secondary winding by way of wire W2 through coil 1X (and coils CX, 2X, 3X and TX in parallel therewith), wire W3, wire W5, brush 40, contact SC2, the left-hand side of rectifier RE and wire W1 to the left-hand side of the transformer secondary. This pulls the rotor one-half pole pitch in a clockwise direction.

In this position coil 92 is deenergized as brush 41 is between stationary contacts. Upon the engagement of brush 41 with contact SC2 as the car arrives at the second floor, a circuit is again completed for coil 92 but in the opposite direction as the circuit is through the left-hand side of rectifier RE. This excites pole pieces 97 and 98 for opposite polarity so as to be attracted by the next adjacent rotor magnets in a clockwise direction, causing the rotor to be pulled another half pole pitch clockwise into position to display the numeral "2."

The next energization of coil 93 as the car continues upwardly is in the opposite direction as the engagement of brush 40 with contact SC3 causes current flow through the right-hand side of rectifier RE. This pulls the rotor another half pole pitch clockwise. As brush 41 engages contact SC3, coil 92 is energized in a direction to pull the rotor into position to display the numeral "3." These operations are repeated as the car continues its upward movement. Thus the floor numerals are displayed in succession as the car reaches the floors which these numerals designate.

When the car moves downwardly, the rotor is pulled counter-clockwise in steps of one-half rotor pole pitch. This is due to the fact that as the car moves downwardly from the third floor, for example, the engagement of brush 40 with contact SC3 causes excitation of the pole pieces for coil 93 to provide the same polarity as when this brush engaged contacts SC3 during up car travel. Thus, the rotor is pulled counter-clockwise one-half rotor pole pitch. As the corresponding field coils of all the indicators are connected in parallel, all of them operate in synchronism to indicate the same floor positions.

Should the system for any reason get out of step, pin 121 and the stop 123 or 124 which engages the pin of each indicator act to bring the indicator back into step as the car reaches the limit of car travel in the direction in which the indicator is ahead of the car. For example, should the indicator in Figure 2 indicate the first floor when the car is at the second floor, stop 123 engages pin 121 and prevents further counter-clockwise rotation of the rotor as the car moved to the first floor, thus bringing the indicator back into step.

Two half wave rectifiers REB are connected across the coils of the field magnets so as to sustain current flow in the coils during each alternate half cycle that current is not supplied from the source. This minimizes any vibration of the indicator parts. This rectifier may be omitted if desired.

It is to be noted that with the above described arrangement only three hoistway wires are utilized, namely wires W2, W3 and W4. Also only two field magnets are utilized. Supplying the position indicator coils with direct current derived through rectifiers from an alternating current source plus the fact that the rotor is moved one-half rotor magnet pitch at a time insures the proper direction of rotation. Also momentary or repeated breaking of the circuit while a selector brush is opposite a stationary contact does not throw the indicator out of step as the same coil is reenergized in the same direction. The position indicators are suitable for installations of different numbers of floors simply by providing the proper floor indicating characters and positioning the stop 124 in the proper slot. The construction renders the indicator suitable for a large number of floors, twenty-four floors in the arrangement illustrated. Being electromagnetically driven, the indicator is adaptable for various mounting locations, both at the landings and in the car. The provision of pole pieces having three arms average the effect of any difference of magnetic strength of the permanent magnets and provides greater flux path and therefore increases the torque.

Various alterations may be made, especially in the construction of the position indicator fixture, and the indicator may be divorced from the push buttons if desired. Also the indicator may be used for twice the number of floors by connecting the selector stationary contact to every other floor and designating every other floor on the indicator dial. On the other hand, only half the number of permanent magnets may be used and selector stationary contacts utilized for every other floor. The angle between the pole pieces of the two field magnets may be varied. Also the permanent magnets may be provided on the stator and the field magnets rotated. Also other numbers of stator magnets may be utilized. These and many other changes could be made in the above construction and many apparently widely different embodiments of this invention could be made without departing from the scope thereof. It is therefore intended that all matter contained in the above description or shown in the accompanying drawings shall be interpreted as illustrative and not in a limiting sense.

What is claimed is:

1. Elevator car position indicator apparatus comprising; a cylindrical member having a plurality of equally spaced permanent magnets mounted thereon to provide alternate north and south poles; another member having a plurality of pairs of pole pieces spaced so that each pair thereof is positioned to cooperate with said permanent magnets to effect a relative step by step movement of said members as each pair of pole pieces is successively magnetized; exciting windings for said pole pieces; means for causing alternate excitation of said windings with each successive excitation of each winding of alternate polarity and means actuated by said relative movement for indicating car position.

2. Elevator car position indicator apparatus comprising; a cylindrical member having a plurality of permanent magnets mounted thereon in equal spaced relation circumferentially to provide alternate north and south poles; another member having but two pairs of pole pieces mounted thereon for cooperating with said permanent magnets to effect relative rotative movement of said members, said pairs of pole pieces being spaced such that when one pair thereof are in closest proximity to poles of said permanent magnets the other pair of pole pieces are midway between poles of said permanent magnets; exciting windings for said pairs of pole pieces; means for causing alternate excitation of said windings with each successive excitation of each winding of alternate polarity; and floor indicating means actuated by said relative movement of said members.

3. Elevator car position indicator apparatus comprising; a cylindrical rotor having a plurality of equally spaced permanent magnets mounted parallel to the axis of said rotor to provide alternate north and south poles at both ends of said rotor, and carrying a plurality of floor indicating characters; a stator having but a pair of field coils, each having a pair of pole pieces for cooperating with said permanent magnets to effect rotative movement of said rotor, said pole pieces for one field coil disposed midway between adjacent permanent magnets when the pole pieces of the other field coil are in line with said permanent magnets; and means for causing alternate excitation of said field coils with each successive excitation of each coil of alternate polarity.

4. Elevator car position indicator apparatus comprising; a rotor having a rim and a plurality of permanent magnets, one for each of a plurality of floors, mounted parallel to the rotor axis in equal spaced relation on the inside of said rim to provide alternate north and south poles, said rim carrying on the outside thereof a plurality of floor indicating characters, one for each of said floors; a stator having but a pair of field coils, each having a pair of pole pieces for cooperating with opposite ends of said permanent magnets to effect step by step rotative movement of said rotor, said pole pieces for one field coil being displaced one-half rotor magnet pitch from the pole pieces of the other field coil; and means for causing alternate excitation of said field coils with each successive excitation of each coil of alternate polarity.

5. Elevator car position indicator apparatus comprising; a cylindrical member having a plurality of permanent magnets mounted thereon in equal spaced relation circumferentially to provide alternate north and south poles; another member having two pairs of pole pieces mounted thereon for cooperating with said permanent magnets to effect relative rotative movement of said members, one pair of pole pieces being displaced one-half permanent magnet pitch from the other pair of pole pieces; exciting windings for said pairs of pole pieces; a source of current; means including mechanism actuated in accordance with car movement for causing energization of said windings from said source to effect alternate excitation of said pairs of pole pieces and so that each successive excitation of each pair of pole pieces is of alternate polarity and thus cause step by step relative rotative movement of said members one-half permanent magnet pitch at a time; and floor indicating mechanism actuated by said relative movement of said members.

6. Elevator car position indicator apparatus comprising; a rotor having a plurality of permanent magnets mounted thereon in equal spaced relation to provide alternate north and south poles, and carrying a plurality of floor indicating characters; two pairs of pole pieces for cooperating with said permanent magnets to effect rotative movement of said rotor, one pair of pole pieces being displaced one-half rotor magnet pitch from the other pair of pole pieces; exciting windings for said pairs of pole pieces; a source of current; and means including a plurality of stationary contacts and contacting means actuated in accordance with car movement for engaging said stationary contacts for connecting said windings to said source to effect alternate excitation of said pairs of pole pieces and so that each successive excitation of each pair of pole pieces is of alternate polarity and thus cause step by step rotative movement of said rotor one-half rotor magnet pitch at a time.

7. Elevator car position indicator apparatus comprising; a rotor having a plurality of permanent magnets mounted thereon in equal spaced relation to provide alternate north and south poles, and carrying a plurality of floor indicating characters; two pairs of pole pieces for cooperating with said permanent magnets to effect rotative movement of said rotor, one pair of pole pieces being displaced one-half rotor magnet pitch from the other pair of pole pieces; a source of alternating current; a plurality of stationary contacts; contacting means actuated in accordance with car movement for engaging said stationary contacts; exciting windings for said pairs of pole pieces; rectifying means; and circuits connecting said windings to said source through said contacts, contacting means and rectifying means to effect alternate excitation of said pairs of pole pieces and so that each successive excitation of each pair of pole pieces is of alternate polarity and thus cause step by step rotative movement of said rotor one-half rotor magnet pitch at a time.

8. Elevator car position indicator apparatus comprising; a rotor having a plurality of permanent magnets mounted thereon in equal spaced relation to provide alternate north and south poles, and carrying a plurality of floor indicating characters; a stator having a pair of field coils, each having a pair of pole pieces for cooperating with said permanent magnets to effect rotative movement of said rotor, said pole pieces for one field coil being displaced one-half rotor magnet pitch from the pole pieces of the other field coil; a source of alternating current; a plurality of stationary contacts connected to one side of said source, a pair of brushes actuated in accordance with car movement to engage said stationary contacts, one brush connected through one of said coils to the other side of said source and the other brush through the other coil to said other side of said source so that said coils are alternately energized as said brushes alternately engage stationary contacts; and rectifying means in the connection between said one side of said source and said contacts to cause successive energizations of each coil to be with unidirectional current derived from said source and to effect alternate polarities of excitation thereof and thus cause step by step rotative movement of said rotor one-half rotor magnet pitch at a time.

9. Elevator car position indicator apparatus comprising; a rotor having a plurality of permanent magnets, one for each of a plurality of floors, mounted thereon in equal spaced relation to provide alternate north and south poles, and carrying a plurality of floor indicating characters; a stator having a pair of field coils, each having a pair of pole pieces for cooperating with said permanent magnets to effect rotative movement of said rotor, said pole pieces for one field coil being displaced one-half rotor magnet pitch from the pole pieces of the other field coil; a source of alternating current; a plurality of stationary contacts, one for each of a plurality of floors; a pair of brushes actuated in accordance with car movement to engage said stationary contacts, one brush positioned to engage the contact for the floor at which the car is positioned and the other positioned in between that contact and the next contact above; circuits connecting one side of said source to said contacts and connecting one of said brushes through one of said coils to the other side of said source and the other brush through the other coil to said other side of said source so that said coils are alternately energized as said brushes alternately engage stationary contacts; and rectifying means in the connection between said one side of said source and said contacts to cause each successive energization of each coil to be with unidirectional current derived from said source and in the opposite direction to effect step by step rotative movement of said rotor one-half rotor magnet pitch at a time.

10. Elevator car position indicator apparatus comprising; a rotor having a rim and a plurality of permanent magnets, one for each of a plurality of floors, mounted parallel to the rotor axis in equal spaced relation on the inside of said rim to provide alternate north and south poles, said rim carrying a plurality of floor indicating characters on the outside thereof; a stator having a pair of field coils and a pair of pole pieces for each field coil for cooperating with opposite ends of said permanent magnets to effect rotative movement of said rotor, said pole pieces for one field coil being displaced one-half rotor magnet pitch from the pole pieces of the other field coil; a source of alternating current; a pair of half-wave rectifiers; mechanism actuated in accordance with movement of the elevator car having a plurality of stationary contacts, one for each of a plurality of floors, with alternate contacts connected together to form two groups, a pair of brushes for cooperating with said stationary contacts, one positioned to engage the contact for the floor at which the car is positioned and the other positioned above, one-half the minimum distance between contacts; and circuits connecting one side of said source to said groups of contacts through different ones of said half-wave rectifiers and connecting one of said brushes through one of said coils to the other side of said source and the other brush through the other coil to said other side of said source so that said coils are alternately energized as said brushes engage stationary contacts with each successive energization of each coil by direct current derived from said source through alternate ones of said half-wave rectifiers to cause alternate polarity of excitation, the connections of said coils being such as to excite said pole pieces for cooperation with said permanent magnets to effect step by step rotative movement of said rotor through a distance of one-half rotor magnet pitch.

11. Circuit controlling apparatus comprising; a plurality of stationary contacts; a plurality of movable brushes for cooperating with said contacts to effect circuit connections through said brushes, one brush at a time, in succession; a source of alternating current; a plurality of electroresponsive means, one for each brush, each of said electroresponsive means being connected to said source by the engagement of the brush for which it is provided with a stationary contact; and unidirectional current conducting means arranged in the circuits from said source to said contacts to cause current supplied to each of said electroresponsive means to be unidirectional and alternately in opposite directions as the brush for which such electroresponsive means is provided engages successive stationary contacts.

12. Circuit controlling apparatus comprising; a plurality of spaced stationary contacts; a pair of movable brushes for successively engaging said contacts and spaced to effect said engagement alternately; a source of alternating current; mechanism controlled by the engagement of said brushes and contacts and including a pair of electroresponsive means alternately connected to said source by the engagement of said brushes with said contacts; and unidirectional current conducting means arranged in the circuits from said source to said contacts to cause current supplied to each electroresponsive means to be unidirectional and alternately in opposite directions as successive energizations thereof take place to effect successive operations of said mechanism.

References Cited in the file of this patent

UNITED STATES PATENTS

| Number | Name | Date |
| --- | --- | --- |
| 366,021 | Paine | July 5, 1887 |
| 1,735,623 | Walker | Nov. 12, 1929 |
| 1,966,987 | Lofgren | July 17, 1934 |
| 2,303,423 | Baum | Dec. 1, 1942 |
| 2,441,557 | Bowne | May 18, 1948 |
| 2,559,339 | Blease et al. | July 3, 1951 |
| 2,659,853 | Morrison | Nov. 17, 1953 |

FOREIGN PATENTS

| Number | Country | Date |
| --- | --- | --- |
| 314,112 | Great Britain | June 24, 1929 |